Patented June 8, 1937

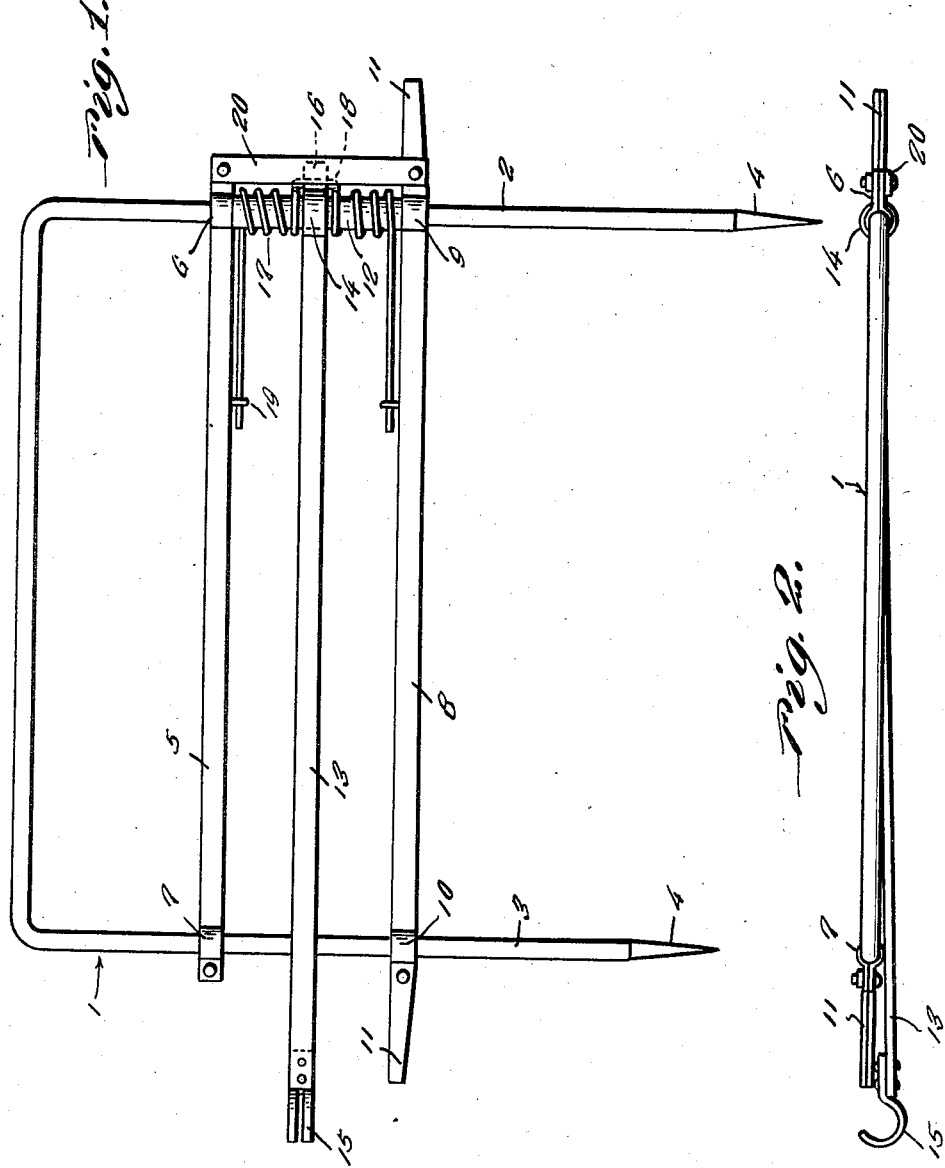

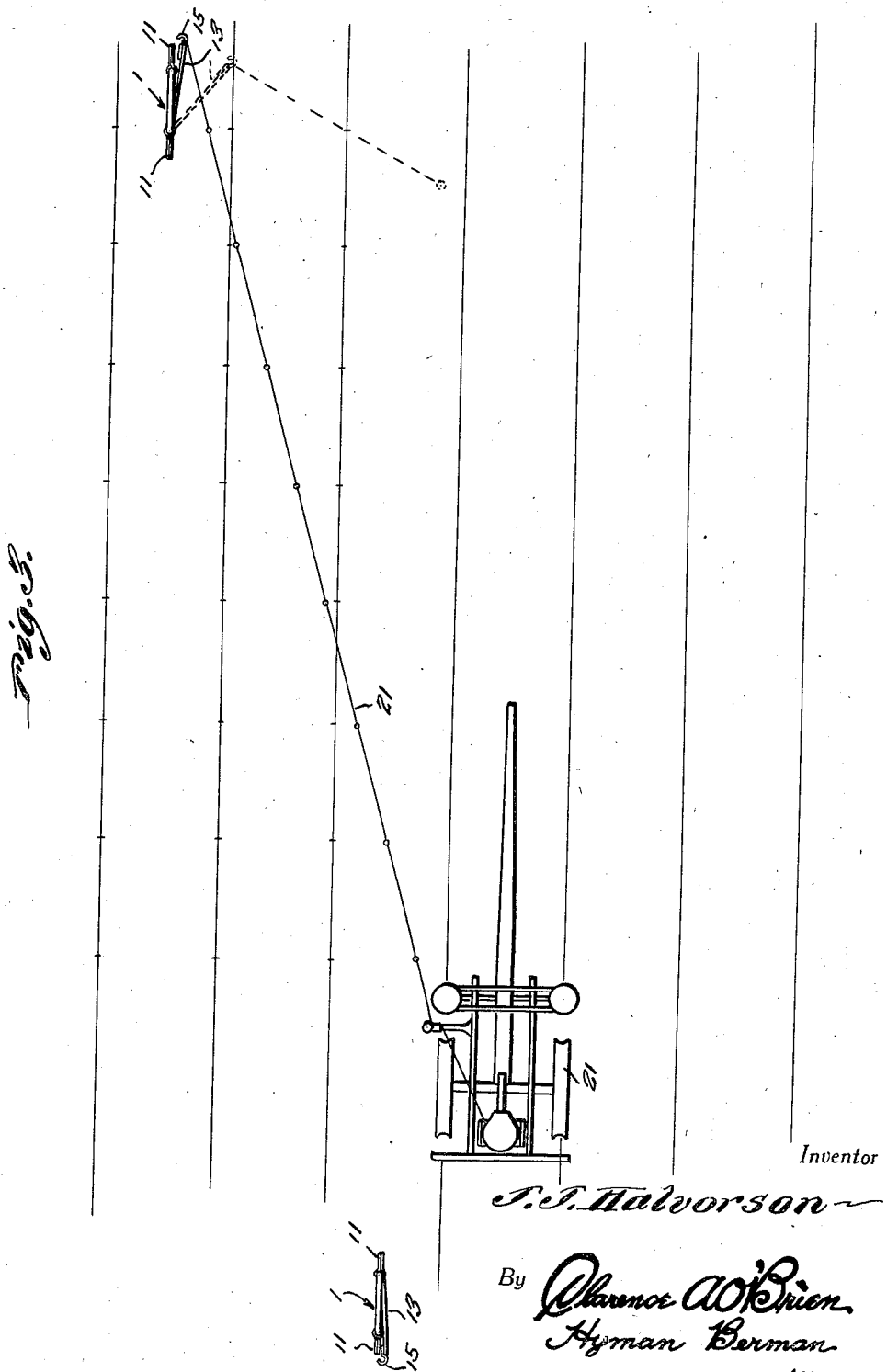

2,083,163

UNITED STATES PATENT OFFICE 2,083,163

CHECK LINE ANCHOR

John J. Halvorson, Winona, Minn.

Application December 28, 1936, Serial No. 117,994

4 Claims. (Cl. 111—49)

The present invention relates to new and useful improvements in check line anchors for planters and has for one of its important objects to provide, in a manner as hereinafter set forth, a device of this character embodying a novel construction, combination and arrangement of parts through the medium of which a line will be automatically paid out as the planter approaches thereby permitting said planter to be driven substantially up to the end of the field before it is necessary for the operator to get off and reset the anchor, as is usually done at present, thus saving considerable time and labor.

Other objects of the invention are to provide a check line anchor of the aforementioned character for planters which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is an elevational view of a check line anchor constructed in accordance with the present invention.

Figure 2 is a view in top plan thereof.

Figure 3 is a plan view, showing a pair of check line anchors embodying the present invention at opposite ends of a field.

Figure 4 is a detail view in perspective of the tubular member on which the swinging arm is mounted.

Referring now to the drawings in detail, it will be seen that the embodiment of the invention which has been illustrated comprises a substantially U-shaped stake of suitable metal which is designated generally by the reference numeral 1, said stake including comparatively long and short legs 2 and 3, respectively. The lower ends of the legs 2 and 3 are pointed, as at 4, to facilitate forcing the stake into the ground.

Extending between the legs 2 and 3 of the stake 1 is an upper brace 5 of suitable metal. The brace 5 is adapted for vertical adjustment on the legs 2 and 3, said brace being secured in adjusted position through the medium of clamps 6 and 7 on its ends. Spaced below the brace 5 is a lower brace 8 having clamps 9 and 10 on its ends for securing said brace in adjusted position on the legs 2 and 3. Projecting from the clamps 9 and 10 are foot rests 11 to facilitate driving the legs 2 and 3 into the ground.

Journalled on the leg 2, between the clamps 6 and 9, is a tubular member 12. The reference numeral 13 designates a metallic arm having on one end portion a clamp 14 which is secured to the tubular member 12 for mounting said arm 13 thereon for swinging movement in a horizontal plane. Mounted on the free end of the arm 13 is a removable slotted hook 15.

As best seen in Fig. 1 of the drawings, the pivoted end of the arm 13 projects beyond the clamp 14, as at 16. Encircling the tubular member 12, above and below the clamp 14, is a coil spring 17 having a substantially U-shaped intermediate portion 18 engaged behind the end portion 16 of the arm 13. The end portions of the spring 17 are anchored to the braces 5 and 8 through the medium of eyebolts or the like 19. The arm 13, it will be noted, is of a length greater than the distance between the legs 2 and 3. Extending vertically between the clamp 6 and the adjacent foot rest 11 and paralleling the tubular member 12 is a metallic bar 20 with which the portion 16 of the arm 13 is engageable for limiting the swinging movement of said arm 13 against the tension of the spring 17.

In use, one of the devices is positioned at each end of the field being planted, as illustrated to advantage in Fig. 3 of the drawings. In said Fig. 3 of the drawings, reference numeral 21 designates a conventional planter and 22 is the usual check line. The check line 21 is, of course, engaged in the hook 15 of the arm 13 on the device which is located at that end of the field toward which the planter is travelling. As the planter approaches the end of the field the arm 13 swings outwardly against the tension of the spring 17 in a manner to pay out the check line 21, as suggested in dotted lines in Fig. 3 of the drawings. It will thus be seen that the planter may be driven substantially up to the end of the field before it is necessary for the operator to get off to make the usual adjustments preparatory to turning back. The arm 13 is engageable with the leg 3 for limiting the swinging movement of said arm in one direction under impulsion by the spring 17. Swinging movement on the arm 13 in the opposite direction is positively limited by the bar 20 thereby preventing damage to the spring 17. The comparatively long leg 2 facilitates mounting the stake 1 in the ground at an inclination.

It is believed that the many advantages of a check line anchor constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:—

1. A check line anchor comprising a substantially U-shaped stake adapted to be mounted in the ground, an arm journalled for swinging movement in a horizontal plane on one of the legs of the stake and engageable with the other leg of said stake, a hook on the free end of the arm engageable with a check line, said arm being adapted for swinging movement in one direction by the check line, and a spring mounted on said one leg of the stake and engaged with the pivoted end of the arm for yieldingly resisting actuation of said arm by the check line.

2. A check line anchor comprising a substantially U-shaped stake adapted to be mounted in the ground, vertically spaced braces extending horizontally between the legs of said stake, a tubular member journalled on one of the legs of the stake between the braces, an arm secured, at one end, on the tubular member for swinging in a horizontal plane and adapted for connection with a check line for actuation in one direction thereby, and a spring mounted on the tubular member and engaged with the pivoted end portion of the arm for yieldingly resisting movement of said arm under the influence of the check line, the end portions of said spring being anchored to the braces.

3. A check line anchor comprising a substantially U-shaped stake adapted to be mounted in the ground, vertically spaced upper and lower braces extending horizontally between the legs of the stake, a tubular member journalled on one of the legs of the stake between the upper and lower braces, an arm fixed, at one end portion, to said tubular member for swinging movement in a horizontal plane, means for connecting the arm to a check line, said arm being operable in one direction by the check line, and a spring mounted on the tubular member and engaged with the arm for yieldingly resisting movement of said arm under the influence of the check line, said spring including coils encircling the tubular member above and below the arm and further including a substantially U-shaped intermediate portion engaged with the pivoted end portion of said arm, the ends of said spring being anchored to the upper and lower braces.

4. A check line anchor comprising a substantially U-shaped stake adapted to be mounted in the ground, upper and lower braces extending horizontally between the legs of said stake, foot rests projecting longitudinally from the ends of the lower brace, an arm mounted for swinging movement in a horizontal plane on one of the legs of the stake between the braces, means for connecting a check line to said arm, a coil spring mounted on said one leg and engaged with the arm for yieldingly resisting movement thereof in one direction, and a stop extending between the braces for limiting the movement of the arm in said one direction.

JOHN J. HALVORSON